United States Patent
Shah et al.

(10) Patent No.: US 10,180,781 B2
(45) Date of Patent: Jan. 15, 2019

(54) NON-LINEAR SLIDER SYSTEMS AND METHODS

(71) Applicant: PayPal Inc., San Jose, CA (US)

(72) Inventors: Kuntalkumar Bharatkumar Shah, Cupertino, CA (US); Frederique E. Goris, Union City, CA (US); Ayon Sinha, Sunnyvale, CA (US); Hilary Holmquest, Menlo Park, CA (US); Karenina Susilo, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 514 days.

(21) Appl. No.: 14/860,519

(22) Filed: Sep. 21, 2015

(65) Prior Publication Data

US 2016/0011763 A1     Jan. 14, 2016

Related U.S. Application Data (63) Continuation of application No. 11/960,998, filed on Dec. 20, 2007, now Pat. No. 9,141,267.

(51) Int. Cl.
*G06F 3/048*     (2013.01)
*G06F 3/0484*     (2013.01)

(52) U.S. Cl.
CPC ...... *G06F 3/04847* (2013.01); *G06F 3/04842* (2013.01); *G06F 3/04845* (2013.01)

(58) Field of Classification Search
CPC ............. G06F 3/04847; G06F 3/04842; G06F 3/04845
See application file for complete search history.

(56) References Cited

U.S. PATENT DOCUMENTS

| | | | |
|---|---|---|---|
| 5,710,899 A | 1/1998 | Eick | |
| 5,850,531 A | 12/1998 | Cox et al. | |
| 6,157,381 A * | 12/2000 | Bates | G06F 3/04855 345/684 |
| 6,922,816 B1 * | 7/2005 | Amin | G06F 3/04847 715/732 |
| 7,111,239 B2 | 9/2006 | Morris-Yates | |
| 7,222,308 B2 | 5/2007 | Sauermann et al. | |
| 7,328,412 B1 | 2/2008 | Cannistraro et al. | |
| 7,380,216 B2 * | 5/2008 | Feig | G06F 3/04847 715/786 |
| 7,797,643 B1 | 9/2010 | Jobs et al. | |
| 9,141,267 B2 | 9/2015 | Shah et al. | |
| 2005/0211075 A1 | 9/2005 | Desai et al. | |

(Continued)

OTHER PUBLICATIONS

"U.S. Appl. No. 11/960,998, Examiner Interview Summary dated Dec. 17, 2014", 3 pgs.

(Continued)

*Primary Examiner* — Justin S Lee
(74) *Attorney, Agent, or Firm* — Maschoff Brennan (57) ABSTRACT

Systems and methods disclosed herein accept a position along a length of a value-selection display screen widget. The value-selection widget is depicted in a graphical user interface that is displayed on a screen of a mobile device. A selection of the position along a length of the value-selection widget is received. A value corresponding to the position is determined. The determining is performed by relating a first ratio to a second ratio. The determined value corresponding to the position is displayed on the screen.

18 Claims, 5 Drawing Sheets

(56) References Cited

U.S. PATENT DOCUMENTS

2005/0262451 A1 11/2005 Remignanti et al.
2005/0275655 A1 12/2005 Stolze et al.
2007/0060798 A1 3/2007 Krupnik et al.
2008/0088720 A1 4/2008 Cannistraro et al.
2008/0184167 A1 7/2008 Berrill et al.
2008/0301584 A1 12/2008 Akagi et al.
2009/0164886 A1 6/2009 Shah et al.

OTHER PUBLICATIONS

"U.S. Appl. No. 11/960,998, Final Office Action dated Aug. 16, 2013", 35 pgs.
"U.S. Appl. No. 11/960,998, Final Office Action dated Sep. 21, 2011", 29 pgs.
"U.S. Appl. No. 11/960,998, Final Office Action dated Nov. 6, 2014", 24 pgs.
"U.S. Appl. No. 11/960,998, Non Final Office Action dated Feb. 4, 2013", 30 pgs.
"U.S. Appl. No. 11/960,998, Non Final Office Action dated Mar. 31, 2011", 26 pgs.
"U.S. Appl. No. 11/960,998, Non Final Office Action dated May 21, 2014". 24 pgs.
"U.S. Appl. No. 11/960,998, Notice of Allowance dated May 18, 2015", 9 pgs.
"U.S. Appl. No. 11/960,998, Response filed Feb. 6, 2015 to Final Office Action dated Nov. 6, 2014", 15 pgs.
"U.S. Appl. No. 11/960,998, Response filed Apr. 11, 2013 to Non Final Office Action dated Feb. 4, 2013", 17 pgs.
"U.S. Appl. No. 11/960,998, Response filed Jun. 23, 2011 to Non Final Office Action dated Mar. 31, 2011", 14 pgs.
"U.S. Appl. No. 11/960,998, Response filed Aug. 21, 2014 to Non Final Office Action datedMay 21, 2014", 13 pgs.
"U.S. Appl. No. 11/960,998, Response filed Nov. 3, 2011 to Final Office Action dated Sep. 21, 2011", 16 pgs.
"U.S. Appl. No. 11/960,998, Response filed Nov. 18, 2013 to Final Office Action dated Aug. 16, 2013", 13 pgs.
Joe Pasquale, "The Slide Rule: Calculating by Mind and Hand", Oughtred Society Meeting MIT, (Nov. 18, 2005), 1-62.

\* cited by examiner

NON-LINEAR SLIDER SYSTEMS AND METHODS

PRIORITY

The application is a continuation of and claims the benefit of priority to U.S. patent application Ser. No. 11/960,998, filed on Dec. 20, 2007, which is hereby incorporated by reference herein in its entirety.

TECHNICAL FIELD

The present application relates generally to the fields of computer man/machine interface systems and methods, and in one example to screen widgets for making a selection from a range.

BACKGROUND INFORMATION

So-called "screen widgets" are sometimes implemented by software applications to enable a user to interact with an application in an intuitive way. A screen widget typically includes one or more images to display information or choices to the user. The user typically interacts with a widget image by "gesturing" relative to the image. For example, the user may point, click, or drag with a mouse or other pointer device or via key presses. A computer code module associated with the widget detects the user gestures and interprets particular gestures relative to the images as pre-defined types of user inputs.

Some widgets are designed to view and/or select from a set of items or choices or to scroll within a range of a variable. Such widgets may include check boxes, radio buttons, drop-down lists, and sliders. A value-selection widget such as a slider may be particularly useful for quickly examining and choosing from a range of numbers. The numbers may represent a selectable or viewable range of a variable such as price in the field of commerce, population in the field of demographics, or focal length in the field of optics, for example.

Factors that may affect the ease of use of a slider widget may include the magnitude of the upper and lower limits of the range of values to be selected from, the granularity of the step-changes from one value to the next, the length of the slider bar in screen pixels, and the sensitivity of the mouse or other pointer device. So, for example, an eight centimeter-long slider used to select from among 40 variable values may be easier to use than a three-centimeter slider used to select from among 10,000 values. The latter slider design may result in awkward selection because the number of values per linear slider distance is greater than can be comfortably controlled with a mouse or other input device of a given sensitivity.

DETAILED DESCRIPTION

The term "widget" is used herein to refer to any component or visual element of a graphical user interface (e.g., an operating system or application graphical user interface, a Web page, a game system user interface, a mobile devices interface etc.).

Figure 1:
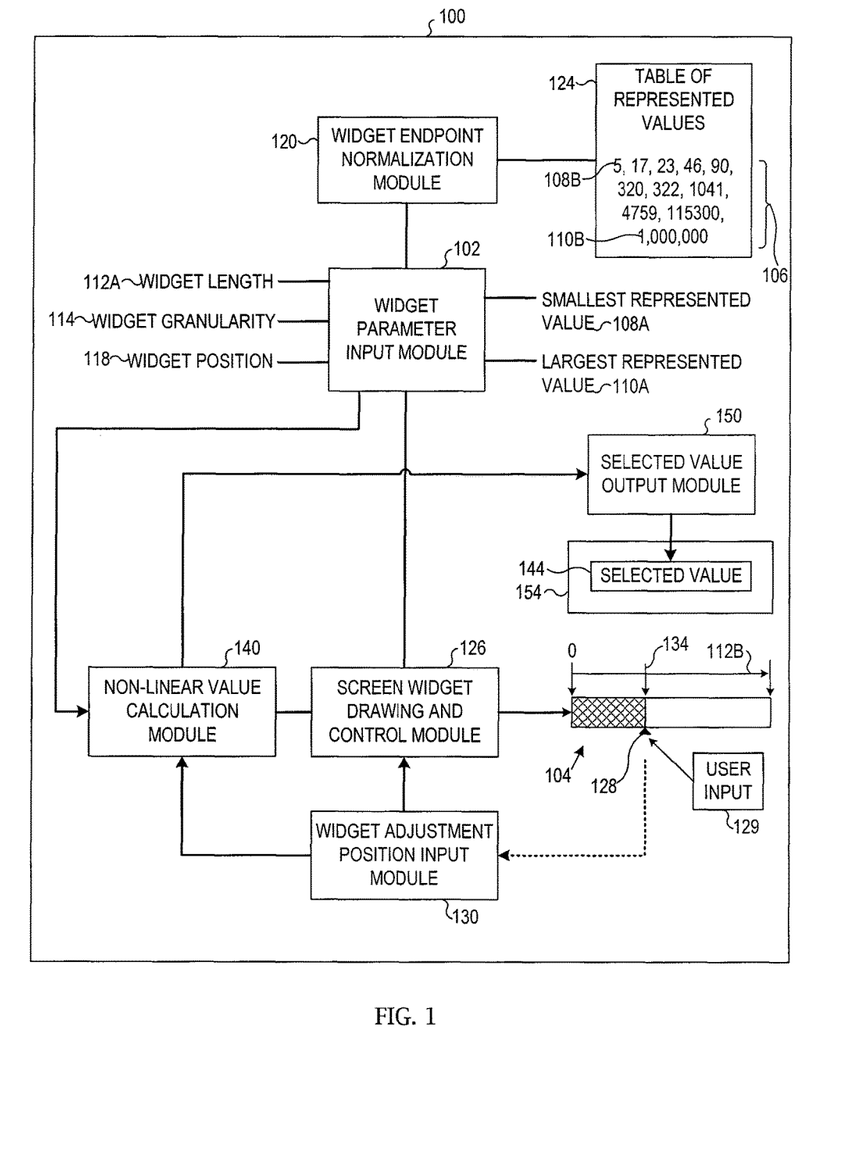
FIG. 1 is a block diagram of a system according to various embodiments.

FIG. 1 is a block diagram of a system 100 according to various embodiments described herein. The various embodiments operate to establish a non-linear relationship between a user-selected position of a numerical value-selection display screen widget adjuster such as a slider and a range of numerical values represented by the widget. The non-linear relationship may be useful for discriminating between numerical values that are small relative to values at the higher end of the range of values. This may be particularly true if values at the higher end of the range are several orders of magnitude greater than values at the low end of the range.

For example, consider a slider widget with a total length of 100 screen pixels used to represent a range of numerical values between zero and 1,000,000. Suppose that a user wishes to select a value of 63 from the range of values. Each pixel distance along the slider length corresponds to a value of 1/100*1,000,000=10,000. Because of the extreme range of numerical values, a linear relationship between the slider position and the range values prevents the user from selecting the desired value of 60.

On the other hand, in an example embodiment a ratio of the slider position to the maximum slider length may be related to a ratio of the base ten logarithm of the desired selection value to the base ten logarithm of the largest represented value in the range. Using values from the previous example: (user-selected slider position, in pixels)/100=$\log_{10} 63/\log_{10} 1,000,000$. The user-selected slider position in this example is $100*(\log_{10} 63/\log_{10} 1,000,000)=30$ pixels, a slider position that may be more easily selected.

The above-described embodiment using a logarithmic relationship between values to be selected and slider positions is merely an example. Other non-linear relationships may be established to best fit a particular range of values to any value-selection display screen widget. Some embodiments may employ other non-linear relationships to display screen widgets with non-linear shapes. A circular value-selection widget may invite input selections using positions along a circumferential length, for example, or by selecting pie-shaped portions of the circle. Other selectable lengths may be associated with other curves and shapes.

Indeed, numerous details are set forth below in order to provide a thorough understanding of example embodiments. It will, however, be evident to one skilled in the art that implementation details will vary according to the practice of particular ones of the many embodiments contemplated by the present invention conceptualization.

It is also noted that the invention conceptualization contemplates the possibility of multiple value-selection input widgets occurring on a single presentation page. The multiple widgets may comprise instances of the same widget or may include different types of widgets. In some embodiments, value selection operations performed by two or more widgets may be interactive or may address different decimal positions of granularity relative to a single input variable. For example, one widget may be used to select a number of miles associated with a distance parameter and a second widget may be used to complete the input operation by selecting a number associated with the distance parameter.

The system 100 may include a screen widget parameter input module 102. The screen widget parameter input module 102 may be used by systems or administrative personnel to configure a value-selection display screen widget 104. Once configured, the screen widget 104 may be used by a user community to select a value from a range of values 106. The widget parameter input module 102 may accept one or more of a smallest represented value 108A and 108B associated with the range of values 106, a largest represented value 110A and 110B associated with the range of values 106, a length 112A and 112B of the screen widget 104, an adjustment granularity 114 associated with the widget 104, or a position 118 of the screen widget 104 on a display screen.

The system 100 may also include a screen widget endpoint normalization module 120 coupled to the screen widget parameter input module 102. The screen widget endpoint normalization module 120 may operate to normalize the smallest represented value 108A, 108B associated with the range of values 106 to a value of zero.

The system 100 may optionally include a table of represented values 124 communicatively coupled to and accessible by the screen widget parameter input module 102. The optional table of represented values 124 may contain the range of values 106. The range of values 106 may alternatively be input by hand, may have arrived from another source via interprocess communications or other interface, or may be calculated or otherwise programmatically derived.

The system 100 may also include a screen widget drawing and control module 126 communicatively coupled to the screen widget parameter input module 102. The screen widget drawing and control module 126 draws the value-selection screen widget 104. The screen widget drawing and control module 126 also refreshes a displayed selector position 128 associated with a user input 129 to the screen widget 104.

The system 100 may further include a display screen widget adjustment position input module 130. The display screen widget adjustment position input module 130 may accept a user-selected adjustment position 134 associated with the screen widget 104. In some embodiments the screen widget 104 may comprise a slider widget as depicted in FIG. 1. However it is noted that the slider widget is merely representative of many possible display screen widgets contemplated by the invention.

The system 100 may also include a non-linear value calculation module 140 coupled to the screen widget adjustment position input module 130. The non-linear value calculation module 140 performs a non-linear calculation on one or more of the user-selected adjustment position 134, the length 112A, 112B associated with the screen widget 104, the smallest represented value 108A, 108B associated with the range of values 106, the largest represented value 110A, 110B associated with the range of values 106, or the adjustment granularity associated with the screen widget 104. The purpose of the non-linear calculation is to determine a selected value 144 corresponding to the user-selected adjustment position 134.

The non-linear calculation may comprise a logarithmic function of the largest represented value 110A, 110B, as described in the example above. However a logarithmic function is merely an example of many non-linear calculations that may be performed on various numerical ranges to enhance the selectability of values from the ranges using a particular value-selection screen widget as contemplated by the current invention.

The system 100 may further include a selected value output module 150 coupled to the non-linear value calculation module 140. The selected value output module 150 may send the selected value 144 to a physical output device 154 such as a display screen or a printer. The selected value output module 150 may also send the selected value 144 to other functional modules (not shown) to be used in further processing, including use in a subsequent calculation and/or query.

Any of the components previously described may be implemented in a number of ways, including embodiments in hardware or software.

Thus, the system 100; the widget parameter input module 102; the screen widget 104; the range of values 106; the smallest represented value 108A, 108B; the largest represented value 110A, 110B; the widget length 112A, 112B; the adjustment granularity 114; the widget position 118; the widget endpoint normalization module 120; the table of represented values 124; the widget drawing and control module 126; the displayed selector position 128; the user input 129; the widget adjustment position input module 130; the user-selected adjustment position 134; the non-linear value calculation module 140; the selected value 144; the selected value output module 150; and the physical output device 154 may all be characterized as "modules" herein.

The modules may include hardware circuitry, optical components, single or multi-processor circuits, memory circuits, software program modules and objects, firmware, and combinations thereof, as desired by the architect of the system 100 and as appropriate for particular implementations of various embodiments.

The apparatus and systems of various embodiments may be useful in applications other than establishing a non-linear relationship between a user-selected position of an adjuster associated with a numerical value-selection widget and a range of numerical values represented by the widget. Thus, various embodiments of the invention are not to be so limited. The illustrations of the system 100 are intended to provide a general understanding of the structure of various embodiments. They are not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 2:
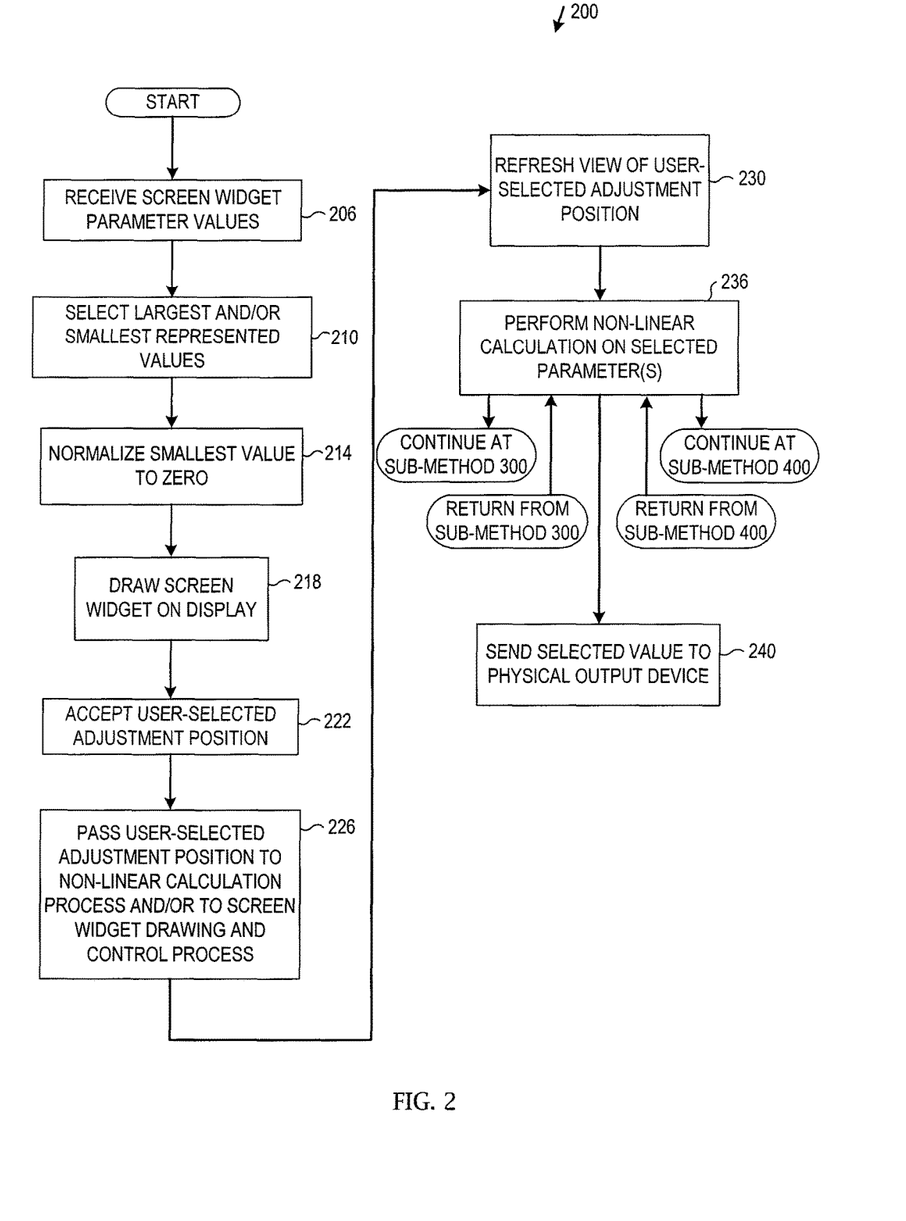
FIG. 2 is a flow diagram illustrating a method according to various embodiments.

FIG. 2 is a flow diagram illustrating a method 200 according to various embodiments. The method 200 may enable the selection of values from the low end of a numerical range containing very large values at the high end of the range using a value-selection display screen widget such as a slider widget. The method 200 may operate to establish a non-linear relationship between positions along an adjustment length of the screen widget and the range of numerical values represented by the widget.

The method 200 may commence at block 206 with receiving a set of screen widget parameter values at an application configuration process. The application configuration process may be used by systems or administrative personnel to configure a value-selection display screen widget. Once configured, the screen widget may be used by a user community to select a value from a range of values. The screen widget parameter values may include one or more of a length of the screen widget, a smallest represented value associated with the range of values, a largest represented value associated with the range of values, an adjustment granularity associated with the screen widget, or a position of the screen widget on a display screen.

The method 200 may continue at block 210 with selecting one or both of a smallest represented value or a largest represented value from a table containing the range of values. In some embodiments the method 200 may include normalizing the smallest represented value associated with the range of values to zero, at block 214.

The method 200 may also include drawing the screen widget on a display screen, at block 218 and accepting a user-selected adjustment position associated with the screen widget, at block 222. Using a slider widget as an example of a value-selection display screen widget, the user-selected adjustment position is the slider position. The method 200 may further include passing the user-selected adjustment position to a process used to perform the non-linear calculation, to a screen widget drawing and control process, or to both, at block 226. The method 200 may also include refreshing a view associated with the user-selected adjustment position, at block 230.

The method 200 may continue at block 236 with performing a non-linear calculation on one or more of the user-selected adjustment position, the length of the screen widget, the smallest represented value associated with the range of values, the largest represented value associated with a range of values, or the adjustment granularity associated with the display screen widget. The non-linear calculation is made to determine a selected value corresponding to the user-selected adjustment position of the screen widget.

Figure 3:
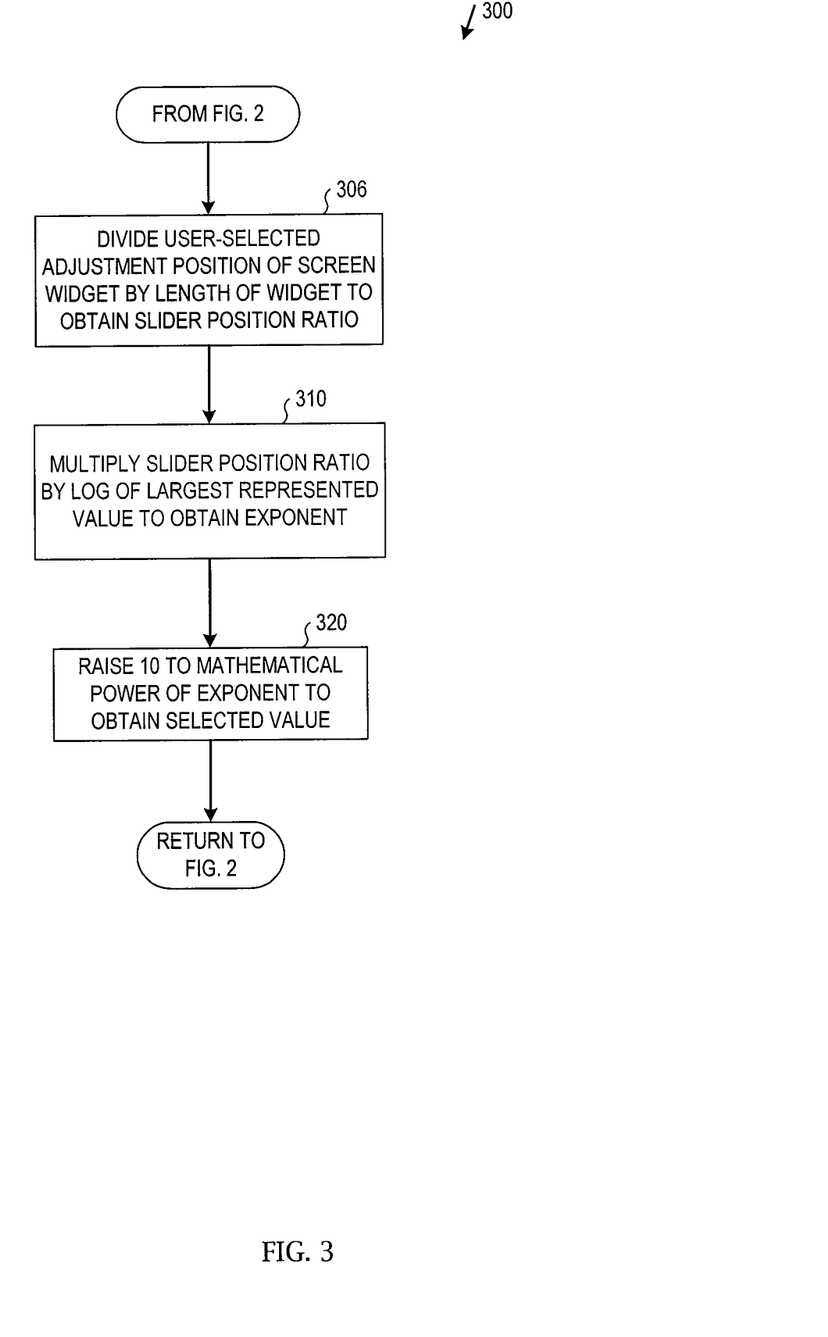
FIGS. 3 and 4 are flow diagrams illustrating sub-methods according to various embodiments.
Figure 4:
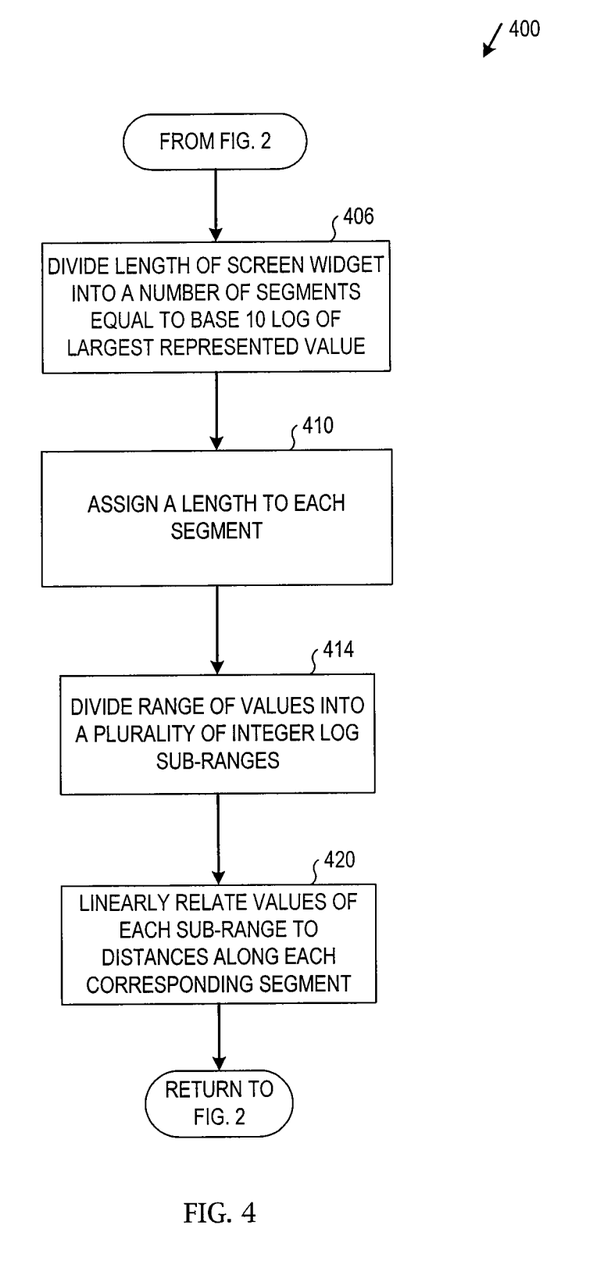

The method 200 may invoke one or both of two sub-methods 300 and/or 400 to perform the non-linear calculation. The method 200 may conclude an iteration of the method 200 at block 240 by sending the selected value to a physical output device such as a display screen or a printer and/or to other functional modules (not shown) for further processing, including use in a subsequent calculation or query.

FIG. 3 is a flow diagram illustrating a sub-method 300 according to various embodiments. The sub-method 300 may commence at block 306 with dividing the user-selected adjustment position of the screen widget (P) by the length of the screen widget (S) to obtain a slider position ratio (P/S). The sub-method 300 may continue at block 310 with multiplying the slider position ratio by a base ten logarithm of the largest represented value ($V_M$) to obtain an exponent (P/S) $\log_{10}$ ($V_M$). The sub-method 300 may also include performing an exponential operation on a number ten by raising the number ten to a mathematical power corresponding to the exponent to obtain the selected value (Vs), at block 320. Thus, in equation form:

$$V_S = 10^{(P/S)\log_{10}V_M}$$

Using values from a previous example, suppose P=30 screen pixels, S=100 screen pixels, and $V_M$=1,000,000:

$$V_S = 10^{(30/100)\log_{10}1,000,000} = 63.10$$

Thus, a value of 63 is easily selectable.

FIG. 4 is a flow diagram illustrating a sub-method 400 according to various embodiments. The sub-method 400 may commence at block 406 with dividing the length of the screen widget into a selected number of segments. The selected number of segments may equal to one or more of a base ten logarithm of the largest represented value, an integer portion of the base ten logarithm of the largest represented value, or the value of one added to the integer portion of the base ten logarithm of the largest represented value.

The sub-method 400 may continue at block 410 with assigning a length to each of the segments. In some embodiments each segment may be assigned a length equal to all other segments. In some embodiments segments corresponding to the integer portion of the base ten logarithm of the largest represented value may be assigned equal lengths, while the segment corresponding to the fractional portion of the base ten logarithm of the largest represented value may be assigned a fractional length. In the latter case the fractional length may be calculated by multiplying the fractional portion of the base ten logarithm of the largest represented value by the length of a full-length segment.

The sub-method 400 may also include dividing the range of values into a plurality of integer logarithmic sub-ranges of values, at block 414. For example, if the range of values is zero to 10,000, the integer logarithms associated with the range of values are 1, 2, 3, and 4. The values associated with each integer logarithmic sub-range are then 1: 0-9; 2: 10-99; 3: 100-999; and 4: 1,000-9,999. The sub-method 400 may further include linearly relating the values corresponding to each of the plurality of sub-ranges to distances along each corresponding segment, at block 420.

Applying values from the previous examples to the sub-method 400, the total screen widget length of 100 pixels may be divided into six segments of approximately 17 pixels each because the base ten logarithm of 1,000,000 is six and 100 pixels/6=17 pixels (rounded). To select a value of 60 from the range of values of 0-1,000,000 the user may move the slider to the second segment from the left within a slider widget, for example. The 17 pixels of the second segment represent values of 10-99, or 90 different values. Each pixel of the second slider segment length thus represents 90/17=five values. Thus, embodiments using the method 400 on this particular set of values may select the desired value of 63 within plus or minus 5.

It is noted that the sub-methods 300 and 400 are calculation details associated with example non-linear calculation embodiments. Other non-linear calculation embodiments and methods are contemplated by the current disclosure. It is also noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using well-known mechanisms, including application program interfaces, inter-process communication techniques, and remote procedure calls, among others. The teachings of various embodiments are not limited to any particular programming language or environment.

Figure 5:
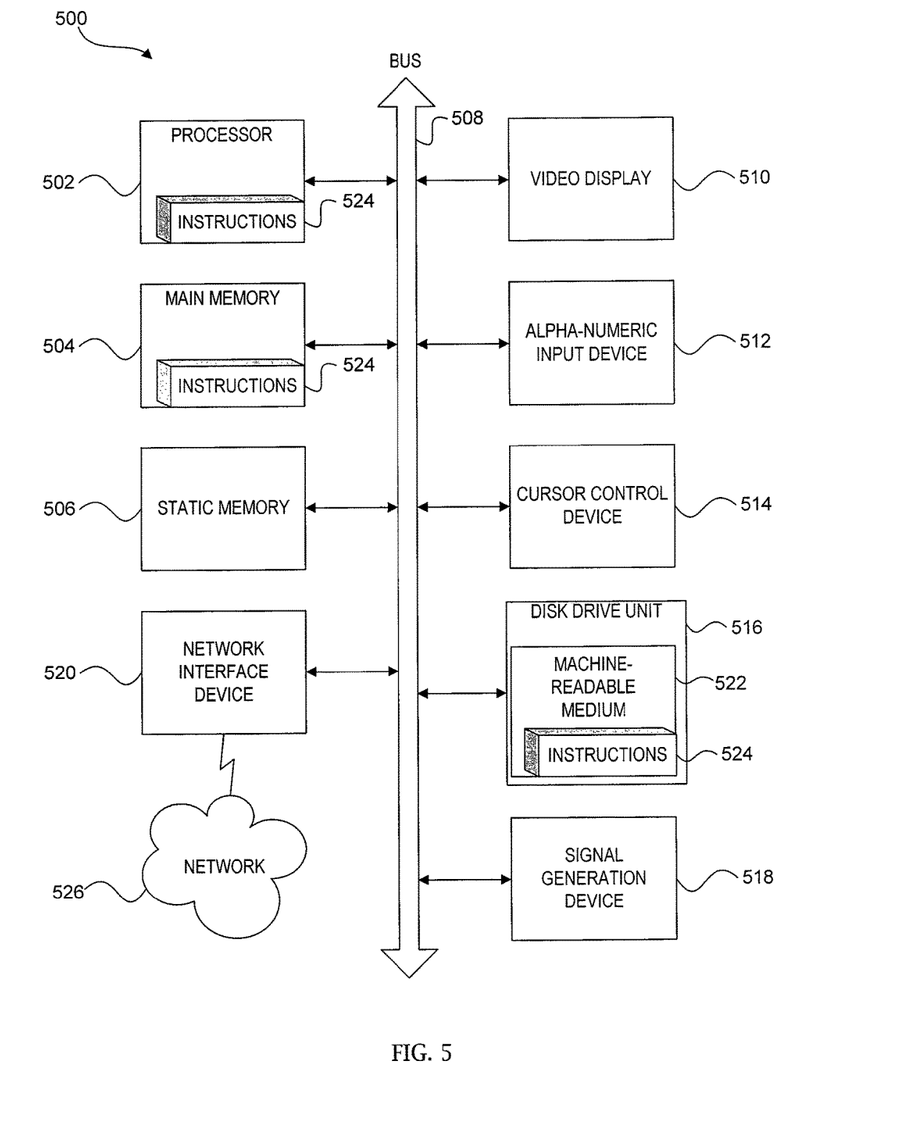
FIG. 5 is a block diagram of a computer for executing a plurality of instructions to perform one or more of the methodologies described herein according to an example embodiment.

FIG. 5 is a block diagram of a computer for executing a plurality of instructions to perform one or more of the methodologies described herein according to an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and/or a static memory 506, which communicate with each other via a bus 508. The computer system 500 may further include a video display unit 510 (e.g., a liquid crystal display (LCD), plasma display, or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518, and a network interface device 520.

The disk drive unit 516 includes a machine-readable medium 522 on which is stored one or more sets of instructions 524 and/or data structures (e.g., software) embodying or used by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

The instructions 524 may further be transmitted or received over a network 526 via the network interface device 520 using any one of a number of well-known transfer protocols (e.g., FTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the example embodiments, or that is capable of storing, encoding, or carrying data structures used by or associated with such a set of instructions. The term "machine-readable medium" shall accordingly be taken to include, but not be limited to, solid-state memories, optical and magnetic media, and carrier wave signals. The computer system 500 may be programmed to perform the methods described herein.

The systems and methods disclosed herein may facilitate user-selection of a wide-ranging set of numerical values by relating the set of values to a length along a value-selection display screen widget according to a non-linear relationship. Enhanced usability of many applications requiring such user selection may result.

The accompanying figures that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. § 1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A mobile device comprising:
   a screen;
   a computer-readable medium having instructions stored thereon; and
   a processor coupled to the screen and the computer-readable medium and configured to, in response to executing the instructions, cause the mobile device to perform operations, the operations comprising:
   displaying on the screen a value-selection widget depicted in a graphical user interface of the mobile device, the value-selection widget being operable to select a range of values including a largest value;
   receiving a selection of a position along a length of the value-selection widget;
   determining a value corresponding to the position by relating a first ratio to a second ratio, the first ratio being the position along the length of the value-selection widget to the length of the value-selection widget, the second ratio being a non-linear calculation of the value to a non-linear calculation of the largest value selectable by the value-selection widget;

dividing the length of the value-selection widget into segments in which the number of segments is based on a result from the non-linear calculation of the largest value;

relating a sub-range of values of the range of values to a specific segment of the segments in which the specific segment includes the received position along the length of the value-selection widget and in which the sub-range of values includes the determined value; and displaying on the screen the determined value corresponding to the received position.

2. The mobile device of claim 1, wherein the operations further comprise:

calculating the first ratio by dividing the position by the length of the value-selection widget; and calculating the second ratio by performing the non-linear calculation on the value and performing the non-linear calculation on the largest value selectable by the value-selection widget.

3. The mobile device of claim 1, wherein the number of segments is equal to an integer portion of the result from the non-linear calculation on the largest value.

4. The mobile device of claim 1, wherein the number of segments is equal to a value of one added to an integer portion of the result from the non-linear calculation on the largest value.

5. The mobile device of claim 4, wherein the dividing further comprises:

assigning a first length to each of the segments except for a last segment among the segments; and assigning a second length to the last segment among the segments.

6. The mobile device of claim 1, wherein:

the value-selection widget depicts a previous position that is different from the received position; and the operations further comprise refreshing on the screen the value-selection widget based on the received position.

7. The mobile device of claim 1, wherein the operations further comprise:

accessing a table of values that includes the range of values; and selecting, from the table, at least one of a smallest represented value in the range of values or a largest represented value in the range of values.

8. The mobile device of claim 1, wherein the operations further comprise:

normalizing a smallest represented value in the range of values to zero.

9. The mobile device of claim 1, wherein:

a shape of the value-selection widget is circular; and the length of the value-selection widget is along a circumference of the value-selection widget.

10. A method comprising:

displaying a value-selection widget depicted in a graphical user interface, the value-selection widget being operable to select a range of values including a largest value;

receiving a selection of a position along a length of the value-selection widget;

determining a value corresponding to the position by relating a first ratio to a second ratio, the first ratio being the position along the length of the value-selection widget to the length of the value-selection widget, the second ratio being a non-linear calculation of the value to a non-linear calculation of the largest value selectable by the value-selection widget;

dividing the length of the value-selection widget into segments in which the number of segments is based on a result from the non-linear calculation of the largest value;

relating a sub-range of values of the range of values to a specific segment of the segments in which the specific segment includes the received position along the length of the value-selection widget and in which the sub-range of values includes the determined value; and displaying in the graphical user interface the determined value corresponding to the received position.

11. The method of claim 10, further comprising:

calculating the first ratio by dividing the position by the length of the value-selection widget; and calculating the second ratio by performing the non-linear calculation on the value and performing the non-linear calculation on the largest value selectable by the value-selection widget.

12. The method of claim 10, wherein the number of segments is equal to a value of one added to an integer portion of the result from the non-linear calculation on the largest value.

13. The method of claim 12, wherein the dividing further comprises:

assigning a first length to each of the segments except for a last segment among the segments; and assigning a second length to the last segment among the segments.

14. The method of claim 10, wherein:

the value-selection widget depicts a previous position that is different from the received position; and the method further comprises refreshing in the graphical user interface the value-selection widget based on the received position.

15. The method of claim 10, further comprising:

accessing a table of values that includes the range of values; and selecting, from the table, at least one of a smallest represented value in the range of values or a largest represented value in the range of values.

16. The method of claim 10, further comprising:

normalizing a smallest represented value in the range of values to zero.

17. The method of claim 10, wherein:

a shape of the value-selection widget is circular; and the length of the value-selection widget is along a circumference of the value-selection widget.

18. A non-transitory machine-readable medium storing instructions that, in response to being executed by one or more processors of a machine, cause the machine to perform operations comprising:

displaying a value-selection widget depicted in a graphical user interface, the value-selection widget being operable to select a range of values including a largest value;

receiving a selection of a position along a length of the value-selection widget;

determining a value corresponding to the position by relating a first ratio to a second ratio, the first ratio being the position along the length of the value-selection widget to the length of the value-selection widget, the second ratio being a non-linear calculation of the value to a non-linear calculation of the largest value selectable by the value-selection widget;

dividing the length of the value-selection widget into segments in which the number of segments is based on a result from the non-linear calculation of the largest value;

relating a sub-range of values of the range of values to a specific segment of the segments in which the sub-range of values includes the determined value; and displaying in the graphical user interface the determined value corresponding to the received position.

* * * * *